Dec. 15, 1953

P. EISLER 2,662,957

ELECTRICAL RESISTOR OR SEMICONDUCTOR

Filed Oct. 23, 1950

2 Sheets-Sheet 1

Inventor
PAUL EISLER

By Emery Holcombe + Blair
Attorneys

Inventor
PAUL EISLER
By Emery Holcombe & Blair
Attorneys

Patented Dec. 15, 1953

2,662,957

UNITED STATES PATENT OFFICE 2,662,957

ELECTRICAL RESISTOR OR SEMI-CONDUCTOR

Paul Eisler, London, England

Application October 23, 1950, Serial No. 191,629

36 Claims. (Cl. 201—73)

This invention relates to electrical resistors or semi-conductors which consist of one or more layers of a homogeneous or heterogeneous electrical resistance or semi-conducting material or materials mounted upon a stiff or flexible insulating support. Such resistors or semi-conductors may form an integral part of a multi-layer sheet material or stock forming a basis for so-called printed circuits, or they may be used as separate components in the form of labels, strips, transfers or the like for incorporation into electrical circuits, or they may be used for a variety of other purposes as will hereinafter appear.

The production of the resistors or semi-conducting components in printed circuits has so far been generally more complicated than the production of separate components, but the latter can for the purpose of this invention be regarded as merely a special case of the printed circuit technique. The invention will therefore be described more particularly in relation to printed circuits, but it is to be understood that the principles, methods and products herein described in relation to printed circuits can readily be adapted or modified as necessary for the production of separate circuit components.

For convenience, in the following description and claims the terms "resistor" and "resistance" will be used, except where the context otherwise requires, to mean not only a component in which a particular fixed or variable ohmic value is the primary requirement, but also a component which exploits the characteristics of the classes of substances known as semi-conductors. Thus, in the present specification, a "resistor" is essentially a component consisting of one or more layers of a substance which is a non-insulator and which exhibits an appreciable ohmic resistance, and which extends between highly conductive electrodes or terminals, whether this component is used purely for the reason of its ohmic value, or because its ohmic value is a function of another variable, or for some special effect. Examples of such components which would not ordinarily be classed as "resistors" but which are regarded as coming within the scope of this term for the purposes of the present specification are:

Strain gauges, pressure gauges, microphones and gramophone pick-ups, where a resistive or semi-conducting layer is subjected to a mechanical force, either steady or vibratory, which affects the value of its ohmic resistance.

Temperature indicating devices such as thermistors, which consist of a semi-conducting layer (e. g. uranium oxide) the ohmic resistance of which varies greatly with changes of temperature.

Light-sensitive elements such as layers of the sulphides, selenides or tellurides of zinc, cadmium or lead, which are photo-conductors.

Rectifying devices such as layers of selenium or cuprous oxide whose ohmic resistance varies according to the direction of the applied voltage, or crystal rectifiers (e. g. layers of silicon carbide, silicon or germanium situated between a large contact and a very small contact).

Devices based on the thermo-electric effect.

Devices based on the Hall effect.

Transistors and the like. In the filamentary transistor a thin germanium film extends between a relatively large base and a collector electrode, and a small emitter electrode is arranged between the base and the collector electrode.

One object of the invention is to provide a multi-layer stock in sheet or strip form for the manufacture of such resistors or printed circuits containing them.

Another object is to provide convenient electrical resistors for the purposes set forth, while a further object is to provide convenient terminal arrangements for the resistors.

Further objects will appear from the following description.

According to one aspect of the invention a multi-layer stock in sheet or strip form for the manufacture of electrical resistors (as defined above) or printed circuits containing them comprises an insulating support, at least one layer of electrical resistance material adhering to the support, and a layer of a highly conductive material adhering to the outer surface of the resistance material and in intimate electrical contact therewith.

Before the stock can act as a resistor an area of the highly conductive layer must be removed, since if an electric potential is applied between two points on a single area of the highly conductive material the current will flow almost entirely through this material so that the underlying resistance layer or layers will be ineffective. But if the two points are on two separate areas of the highly conductive material and an exposed area of the resistance material extends between them, the current will have to flow through the resistance material.

The ohmic value of the resistance will depend upon the specific resistance of the material itself and its thickness, and will also depend upon the shape (i. e. the length and breadth) of the exposed area. It may also depend to some extent on the direction of the resistor axis, or upon a deformation of the support, as will be explained hereinafter.

Separate highly conductive areas at two ends of an area of the resistance layer act as terminals by which the current is led into and out of the resistance layer. Since the highly conductive layer is in intimate electrical contact with the resistance layer the current can readily pass from the terminals into the resistance layer, and vice versa. Also, since the resistance layer is in one plane there is no undesirable "step" such as occurs in conventional printed circuit technique where resistors are formed by painting on or otherwise applying resistance coatings to a support which already bears a conductive pattern. In such a case the resistance coating must overlap the conductive areas to which it is to be connected, and a "step" occurs where the overlap begins.

In certain cases there may be two or more layers of resistance material between the insulating support and the highly conductive layer, these resistance layers having different chemical and/or physical properties. By selectively removing the outer layer or layers of resistance material, resistors having different resistance values per square area can be made. The requirement that these resistance layers must be capable of selective removal is the reason for their having different chemical and/or physical properties, since the layers can then be selectively removed by treatment with different agents.

The multi-layer sheet material consisting of an insulating support, one or more layers of resistance material, and an outer layer of highly conductive material forms the stock or raw material from which printed circuits or separate components can be made. Essentially, the method of converting the stock into the desired product comprises the selective removal of unwanted layers, to leave areas having the required electrical properties, namely insulating areas (all layers above the support removed), resistance areas (the conductive layer removed, and in certain cases also one or more resistance layers from above the particular resistance layer required), and conductive areas (no layers removed).

Thus according to another aspect of the invention a method of making an electric resistor or a printed circuit containing a resistor from a stock as aforesaid comprises selectively removing certain areas of a layer or layers by treatment with an agent or agents capable of removing the said layer or layers, while protecting from the action of the agent or agents those areas of the said layer or layers that are to be retained. This protection may be afforded either by the presence of an overlying area which is unaffected by the agent or agents, or by the prior application of a protective coating.

The outer highly conductive layer of the stock preferably consists of a pre-formed metal foil such as copper foil, tinned copper foil, aluminium foil, zinc foil or silver foil, and any convenient foil thickness may be used, for instance 0.002". The metal of the foil should preferably be soft. Other kinds of highly conductive layer may be used as will be described hereinafter. The metal of these layers should preferably be capable of being soldered so that other conductors or components can be connected to them.

For the insulating base or support almost any insulating film or sheet material can be used. However, since it is usually desirable for the stock to be flexible and mechanically strong it is preferred to use a flexible insulating sheet material, for instance insulating impregnated paper or fabric. Obviously the insulating material must be such that it is unaffected by the various agents employed for selectively removing the superimposed resistance and conducting layers.

Where capacitors are made from the same stock the insulating support should be very thin and must be made of a material having uniform dielectric properties to make it usable as a capacitor dielectric of known square area permittivity.

Many circuits require a stock where the insulating support and one or more resistance layers are sandwiched between two highly conductive layers, and so the invention embraces not only stock in which there are layers on only one side of the insulating support, but also stock in which there is on the side of the insulating support opposite to that which carries the said resistance and highly conductive layers, a further highly conductive layer either alone or associated with at least one further resistance layer.

In certain applications of the invention it may be desirable to contact the resistance layer on some areas from the side adjacent to the insulating support. For many such applications the insulating support may consist of a soluble plastic film or varnish, or it may be a perforated sheet with a soluble plastic film filling the perforations. Alternatively the material of the support may be such that it is easily pierced or split mechanically. Over the area where contact with the inner surface of the resistance layer is desired, the insulating support is dissolved away or pierced, and the exposed inner surface of the resistance layer is metallised or otherwise provided with an electrical contact. For instance, one type of transistor which has the emitter and collector contacts on one side of a germanium layer and the base on the other side can be made in this way.

The material for the resistance layer or layers may take several forms. It may be, for instance, a thin continuous layer of a metal having a specific resistance which is considerably different from that of the outer highly conductive layer. For instance if the outer layer is copper, lead or Nichrome could be used for a resistance layer.

In order to produce stock capable of providing metallic resistors which are stable in value over a wide range of temperatures the following technique may be employed.

In the first place a bimetallic foil is prepared consisting of a layer of a highly conductive metal, and a comparatively much thinner layer of a metal having a high specific resistance and a small temperature coefficient of resistance. The bimetallic foil may be made in a number of ways. For instance, possible methods include cladding by a rolling process, electro-deposition, chemical deposition, vacuum deposition, and deposition from the colloidal state followed by suitable heat treatment.

The highly conductive layer of the bimetallic foil will comprise the outer conductive layer of the stock, and must be capable of being etched away or otherwise removed by an agent which does not attack the thin layer of resistance metal. If desired the selective removal of the outer conductive layer can be assisted by providing a thin parting film of conducting material between the two metal layers, this film being removable by an agent which does not harm the thin layer of resistance metal. The parting film may be a very thin metal film or a non-metallic film such as a carbon-resin film.

As regards the constitution of the metal of the thin resistance layer, an alloy of manganese (over 80%) and copper heat treated to over 600° C. would be very suitable. This alloy has been reported to have a resistivity of 500 to 1600 microhms per centimetre cube, and a very small temperature coefficient. Other suitable alloys are, for example, certain copper-manganese-nickel alloys; copper-nickel alloys; nickel-silvers (i. e. alloys of copper, nickel and zinc); copper-silicon; copper-nickel-chromium; chromium-nickel; and chromium-nickel-iron. Some alloys of noble metals are also suitable, for example silver-palladium.

Factors which govern the choice of the alloy are, for instance, the requirement of differential solubility of the alloy and the metal of the foil, and the ease of forming a layer of the alloy on the foil. The foil base for the alloy layer permits of a continuous and readily controllable layer-forming operation, the choice of surface from very smooth to deeply grained, and the use of high temperatures during or after the formation of the layer on the foil.

Another important class of materials suitable for forming the resistance layer or layers consist of carbon powder or graphite powder or colloidal graphite in a binder. Such layers can be produced by coating the foil or the insulating backing, for instance by roller coating, the coating preferably being thinned by being carried in solution or as an emulsion. After coating the carrier is driven off, for instance by evaporation. Alternatively, self-supporting films from about a half-thousandth of an inch up to a few thousandths of an inch thick can be made when certain binders are employed. These films can then be bonded to the insulating support or to the metal foil with the aid of heat and pressure. The bonding of the resistance layer to the insulating carrier is preferably effected or assisted by the use of an insulating cement, while the bonding of the resistance layer to the metal foil can be effected or assisted by the use of a conductive cement.

A type of carbon and graphite of a dense single-phase structure and known by the name "Delanium" (a registered trade-mark of Powell Duffryn Carbon Products Limited) should be suitable for coating on to the metal foil and heat treatment in situ. A coating of this sort should have a large number of carbon-to-carbon linkages, and should provide a more crystalline layer or film than is obtainable with other forms of carbon, requiring a minimum amount of binder or even enabling a binder to be dispensed with altogether. The term "coating" is intended to cover any suitable method of depositing or providing a layer of "Delanium" carbon or graphite on the metal foil.

The resistance layer need not necessarily extend completely over the metal foil or insulating support. Thus it may be of reticular form, i. e. in the form of a pattern consisting of a network of straight or curved lines which may be of any desired width or thickness. The lines of the network may be produced, for instance, by printing a negative of a half-tone screen on to the foil with a resistance ink.

The binder for the particles of the resistance material must be compatible with the particles, and may be a synthetic or natural glue, rubber or resin. In the latter case a resin mixture is preferably used, which is plasticised to render it less brittle and uniformly adhesive, unless the resin or resins themselves have this quality. The binder should be insoluble in water and non-absorbent when in its finished state. It must be unaffected by the agent employed for removing the unwanted parts of the highly conductive outer layer. Hence it is preferably stable to acids or electrolytes used in etching processes, particularly iron perchloride or copper sulphate baths. Preferably the binder should be of a flexible nature. A further characteristic which the binder must have is that it must be capable of removal from the insulating support by an agent which does not affect that support whether this agent be heat or a solvent or a chemical reagent or mechanical forces such as those acting in abrasive treatments.

Where there are two or more layers of resistance material the binders of each resistance material must be capable of selective dissolution so that an agent which is used to remove one layer of resistance material will not affect the other layer or layers. The binder of an inner resistance layer, that is a layer which is not immediately adjacent to the outer conductive layer, need not necessarily be resistant to the agent used for removing the outer conductive layer, since this resistance layer will normally be protected by the outer resistance layer or layers during the metal removing process.

The following are examples of suitable binders.

Bichromated fish glue rendered water and acid-proof by heating to about 350° C.

Resins which are soluble in alcohols but are insoluble in aromatic hydrocarbons, such as shellac, albertol, or vinyl acetate.

Synthetic rubbers such as neoprene, or resins such as the styrenes, which are soluble in aromatic hydrocarbons but are insoluble in alcohol.

Silicone rubbers and non-thermosetting adhesive resins such as polyvinyl chloride or Hycar based adhesive mixtures, which are soluble in acetone and have relatively high temperature stability.

Silicone resins made flexible, thermosetting resins, alkyds and bases of heat resisting enamels which when completely set become insoluble. These substances are useful for layers which can be removed or patterned by abrasive treatment.

Fusible binders such as modified waxes and polythene. These last are applicable only for very low wattage loading of the square area.

Although the above list is far from being exhaustive it can be seen that numerous substances can be selected as binders which adequately comply with the requirements outlined above. A number of combinations of binders are possible which will permit selective dissolution of the resistance layers formed with these binders.

Among the principles which guide the selection of a suitable resistance material some are quite obvious, such as the necessity of using a flexible material when the insulating support is itself flexible and is required to be bent or folded.

Another principle guiding the selection is the required specific value of the resistance per unit of area required for the particular resistance layer. Layers consisting of powdered carbon in a binder, or layers consisting of "semi-conductive" metal compounds, are generally more suitable for high ohmic resistances than are layers consisting of metal alone. When a very high wattage loading per unit of area is required a silicone-bound carbon layer carried on a silicone-impregnated glass fibre cloth support is recommended, since a very much higher wattage loading is permissible than with a shellac-bound or like layer on an impregnated paper support. Consequently the resistors can be made smaller with the former materials than with the latter.

Preferably the binder is selected so that it can itself serve to bond the resistance layer to the metal foil or to the insulating support, whereby the use of additional cements is avoided.

Where the stock is to be used for making printed circuits where noise level is of importance, it is preferred to use a resistance layer consisting of a metal or a metal compound, or, if a carbon layer is used, to ensure that there is proper contact between the carbon particles.

Another possible class of resistance layers consists of thermosetting, thermoplastic and elastomeric variants of conductive materials, known as "Markite" conductive plastics, which can be supplied with a conductivity ranging from approximately that of mercury to that of high conductivity rubber, or boron, or even higher. (See pages 96 to 99 inclusive of "Electronics" for October 1949, published by McGraw-Hill Publishing Co. Inc., New York, U. S. A.) Thin films or coatings of two selectively soluble "Markite" plastics, or of a "Markite" plastic and another resistance layer, can be employed for the purpose of the invention.

The above examples of resistance layers are mainly for those resistors which exploit the ohmic value of the layer. Substances of the semi-conducting class may be used as the resistance layer or layers for the production of resistors used for other purposes, such as rectifying, amplifying, or exhibiting sensitivity to changes in temperature or in the quality or intensity of incident light. Intrinsic semiconductors (silicon, germanium or lead sulphide) can be used, as well as impurity semi-conductors such as various metallic oxides, sulphides, selenides or tellurides, and elements such as selenium and tellurium. These semi-conductors can be coated on to a metal foil, which as indicated above in connection with metallic resistance layers affords high controllability and ease of heat treatment, as well as other advantages such as freedom from chemical contamination and exclusion of atmospheric influences.

Having given an indication of some types of resistance materials, foils and insulating backings which may be used in the stock, various methods of manufacturing base materials for printed circuits incorporating resistors, will now be described by way of example with reference to the accompanying drawings in which.

The drawings are highly diagrammatic; for instance, the thickness of the layers in relation to their areas are very much greater than would be the case in practice, and their relative thicknesses may differ substantially from those adopted in practice, which will vary widely depending upon requirements.

The method of manufacture illustrated by Figures 1 to 7 produces a three layer circuit base material in which the area A is to comprise a single layer of insulating material only, the area B is to comprise a double layer consisting of an insulating layer overlaid with a layer of resistance material, and the area C is to comprise three layers, namely an insulating layer overlaid with a layer of resistance material which is in turn overlaid with a layer of highly conducting material.

The stock from which the circuit base material is to be manufactured is made up as follows. A sheet of copper foil F is roller coated with a mixture of colloidal graphite (or other carbon particles) in water and bichromated fish glue. The coating is dried and is then heated to 350° C. so that the carbon-containing layer is burned into the copper foil and becomes insoluble and unattacked by water or etching agents such as iron perchloride. The layer adheres firmly to the foil and forms a coating R which, while conductive, has a considerably higher specific resistance than the foil. The coated foil is very flexible if the right type of glue is used.

Figures 1, 2, 3, 4, 5, 6, 7, 8, 9, 10, 11, 12, 13, 14, 15, 34, 35:
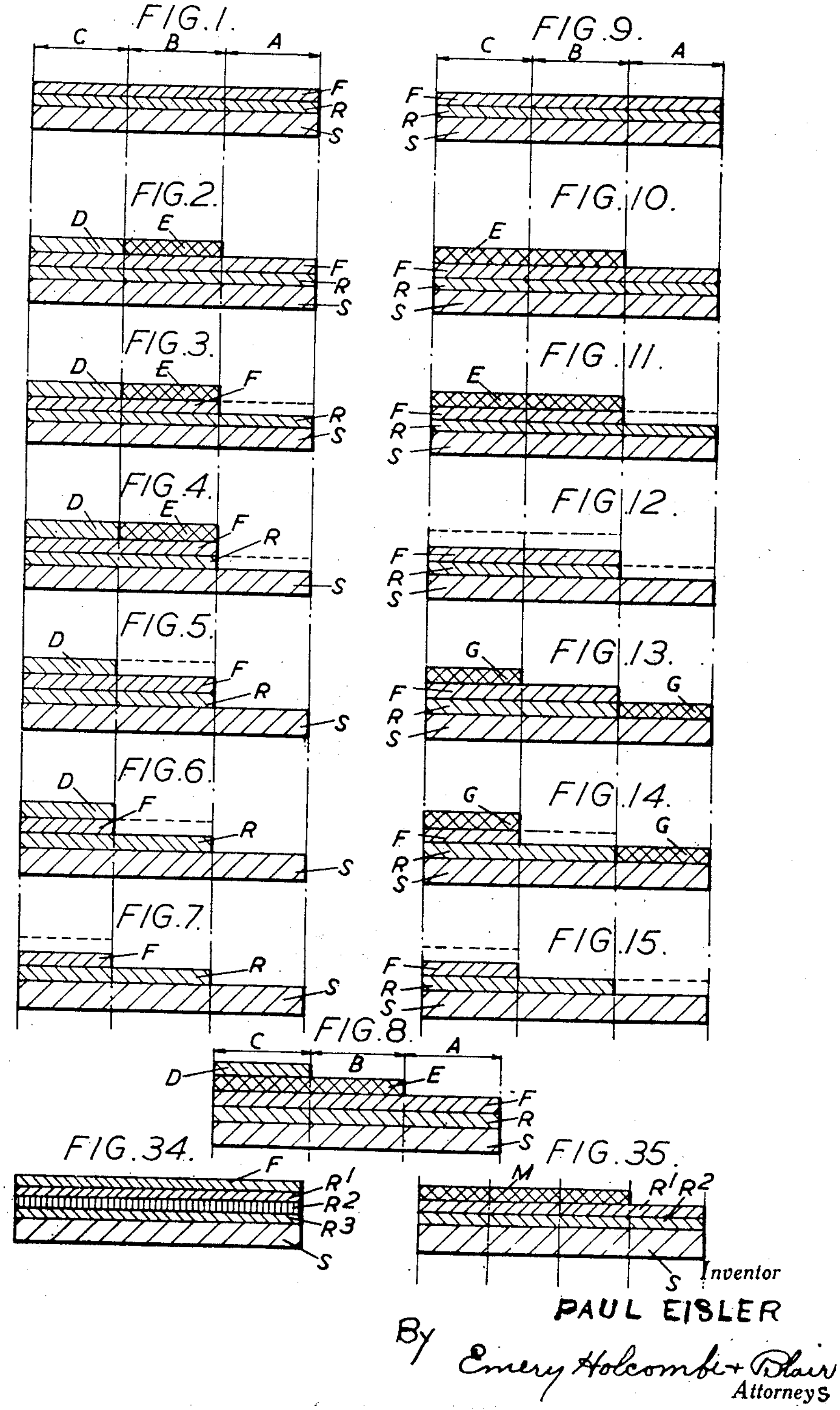
Figures 1 to 7 illustrate the various stages of one method of manufacturing a three layer circuit base material.
Figure 8 illustrates a stage in an alternative method of manufacturing a three layer circuit base material.
Figures 9 to 15 illustrate various stages in a further method of manufacturing a three layer circuit base material.
Figure 34 illustrates the structure of a five layer stock.
Figure 35 illustrates the structure of a modification of a four layer circuit base material during its manufacture.

The coated side of the foil is now cemented to an insulating support S, for instance an insulating impregnated paper, using an insulating cement which is removable by means of a solvent. Thus a synthetic rubber which is soluble in acetone would form a suitable cement. The resulting stock is a three layer sheet as shown in Figure 1 in which the resistance layer R is sandwiched between the foil F and the insulating support S.

The resistance values of the layer R can be calibrated, after the usual ageing and other conditioning treatments of the stock, by cutting out test pieces at various selected points in the length and width of the stock, removing the foil from certain areas in the manner hereinafter described, and thereafter measuring the resistance values of the exposed areas of the resistance layer R. It is important that the test samples should be subjected to the same treatment steps as the stock will have to undergo in practice. If the resistance values of the test pieces are found to be of the required magnitude and sufficiently uniform, the stock is marked with its resistance value per square area, and this value can form the basis of the design of the pattern of a printed circuit for which the stock may be used.

For printed circuit work the stock may be treated so as to provide areas as aforesaid having three different kinds of electrical properties, namely:

(A) Areas from which both the metal foil F and the resistance layer R have been removed, leaving the insulating base S without any conductive coating;

(B) Areas from which only the metal foil F is removed, leaving a resistance layer R on the insulating base; and (C) Areas from which nothing is removed and comprising metal foil overlying the resistance layer and the insulating base.

In printed circuits the areas A comprise non-conducting areas, the areas B comprise resistors the value of which depends upon the length and breadth thereof, while the areas C comprise conducting areas. The conducting areas C may be used, for instance, to form terminals, inductances, interconnections and shieldings, and in some cases may comprise the electrodes of capacitors.

In order to convert the stock shown in Figure 1 into the completed printed circuit base material as shown in Figure 7, in which the various layers in the areas A, B and C are as set out above, a pattern is first printed in two different protective inks on to the metal foil, as shown in Figure 2. One ink D is printed over the foil in the areas C, while the other ink E is printed over the foil in the areas B. In the areas A the foil is left bare. The printing process used may be analogous to the normal "two colour" printing processes, but the inks need only be capable of visual distinction for reasons of control. Both the inks D and E must be acid-resisting, but they must be capable of being dissolved selectively in different solvents. Thus ink D may be soluble in aromatic hydrocarbons and insoluble in aliphatic hydrocarbons while ink C is soluble in aliphatic hydrocarbons but not in aromatic hydrocarbons, or vice versa. The ink D must be alkali-resistant, but the ink E can be alkali-soluble.

The next stage is to submit the printed sheet to a metal-dissolving process, for instance a chemical etching in an iron perchloride bath, until all the metal foil layer F has been removed from the exposed area A as shown in Figure 3. Next the sheet is placed in an alkali bath which removes the exposed resistance layer R from the area A as shown in Figure 4. This removal is helped if the cement used to bond the layer R to the support S is not resistant to alkalis.

In the next stage the sheet is treated with a solvent for the removal of the ink E from the area B as shown in Figure 5, for instance by immersion in a bath or by spraying. If the ink E is alkali-soluble the two stages illustrated by Figures 4 and 5 will occur simultaneously. On the other hand, if the ink E is not alkali-soluble the two stages could still be conducted simultaneously by treating the sheet with a mixture of an alkali and the solvent for the ink E, or with a mixed spray of both liquids.

In the next stage the sheet is again subjected to etching, which removes the metal foil F from the area B as shown in Figure 6.

Finally, after washing with water, the sheet is treated with a solvent for the ink D. With the removal of this ink the required circuit base material is left as shown in Figure 7, in which the area A comprises the insulating support S, the area B comprises the resistance layer R overlying the insulating support S, and the area C comprises the metal foil F overlying the resistance layer R which in turn overlies the insulating support S.

It will be appreciated that the treatment baths will only affect the exposed areas of materials which are soluble in or attacked by the baths, the other areas of these materials being protected by superimposed layers or inks which are not affected by the particular bath concerned.

In an alternative method which in most respects is similar to the method described with reference to Figures 1 to 7 the ink E is printed over the areas B and C, while the ink D is printed over the ink E in the areas C, as shown in Figure 8. This method affords greater protection to the conductive pattern during the etch treatment.

It is not essential to provide sharply defined edges between the areas in all cases. For instance, instead of a straight line border between the metal foil F and the exposed resistance layer R a serrated edge may be provided with many thin tongues of metal extending into the resistance area. In this way a smoother gradation between the highly conducting area C and the area B of relatively high resistance may be achieved. It is also possible, and in some cases to be preferred, to thin down the foil layer C where it adjoins the resistance area B by using a similar technique in the printing and etching process as is used for obtaining different tone values in making a gravure cylinder. This technique consists in making the ink D gradually less resisting to the acid as it approaches the resistance area B. This can be done by using a continuous tone printing technique such as gravure and relying on the variation of ink thickness to give the required variation in acid resistance, or by using a third ink layer on the area in question and relying on the same effect, or by printing a kind of half-tone pattern of the ink D over the ink E (Figure 8) so finely that when the sheet is immersed in the solvent for the ink E those areas of the ink E which are underneath the half-tone pattern of the ink D are not completely removed during the time of the treatment. These areas then protect similar areas of the metal foil during the subsequent etching treatment. The degree of dissolution is a function of the density of the half-tone printing. If the printing is done photographically the ordinary photogravure method is applicable. In this case the varying degree light hardening of the gelatin determines the permeability of the resist to the iron perchloride and thus the degree of etching of the copper foil.

A variation of the printing and etching method described in relation to Figures 1 to 7 and Figure 8 is illustrated in Figures 9 to 15. In this method it is unnecessary to use inks having different solvent characteristics, and moreover it enables the resistance coating of the area A to be removed more quickly, for instance by assisting its dissolution mechanically by swabbing or by abrasion, such as gentle scratching. With a somewhat more drastic abrasive treatment it is possible to remove layers which are insoluble, such as carbon films with binders of fully cured thermosetting resins or vulcanized rubbers. Abrasion may be used alone, or it may be accompanied by swelling treatment or blast action. The metal foil pattern itself can be used as the resist to protect from abrasive action the portions of the underlying layers which are not to be removed.

In this method the three layer stock employed (Figure 9) is the same as that shown in Figure 1. In the first stage the areas B and C are both over-printed with a single layer of ink E, as shown in Figure 10. Next, as shown in Figure 11, the printed sheet is etched, thus removing the exposed metal foil from the area A. If the agent for removing the resistance layer R will also remove the ink E the sheet is next subjected to treatment with this agent, whereby the exposed resistance layer R from the area A and the ink layer E from the areas B and C are simultaneously removed, as shown in Figure 12. This removal can be effected by a dry or wet abrasion process, or by a solvent or swelling agent for the resistance layer and for the ink film, assisted by swabbing if required, since the material beneath the ink layer comprises only metal foil and the material beneath the exposed resistance layer comprises only the insulating support, which are mechanically robust. Alternatively, if the agents for removing the ink E and the resistance layer R are not the same, the state of Figure 12 can either be reached in two stages from the stage of Figure 11 or else, if the two agents are mutually compatible, they may be mixed in a single bath, or applied in some other manner in a single application.

Next the sheet is coated over the areas A and C with an ink, lacquer, or other protective substance G, for instance by printing, painting or spraying, as shown in Figure 13. During this stage the area B is masked, for instance by a stencil. Consequently the foil layer F remains exposed in the area B. The sheet is now subjected to a second etching treatment whereby the exposed metal foil is removed from the area B, as shown in Figure 14. Finally the coating G is dissolved from the areas A and C to leave the desired product as shown in Figure 15. As the support S is unattacked by the etch bath, the ink coating G in the area A may be omitted if desired.

With any of the methods so far described the exposed surface of the resulting sheet may be coated with a non-conducting lacquer, except for those parts of the area C where electric connections are to be made, or the final dissolution of the ink film covering areas C may be effected only on these connection areas. It may sometimes be preferable for the exposed areas of carbon-filled resistance layers also to be left bare, since it has been found that a lacquer coating may on occasion produce unpredictable disturbances in the electric characteristics of such layers. A variation of the method just described may be used in cases where the resistance layer needs a protective coating. This variation will be described later.

The products of the methods described above are base materials for printed circuits formed by conducting areas, non-conducting areas, and integral resistance areas. The latter can have any desired value which may be obtained by suitably designing the shape and by using a square area of the single resistance layer R of suitable square area resistance value. Since it is known from the tests referred to above either that this value is uniform over the whole sheet, or, if it varies, the extent and nature of this variation, the actual value of the resistor will conform to the designed value to a high degree of accuracy. Conversely, the actual value can be accurately predicted from the design data.

In some cases the range of resistance values obtainable by a single resistance layer will not be sufficient, and two or more layers of different resistance materials having different resistance values per square area will be needed. The stock in such cases may consist of an insulating support and a sheet of metal foil sandwiching two (or in some cases three or even more) layers of resistance material which are in intimate contact with each other.

Figures 16, 17, 18, 19, 20, 21, 22, 23, 24, 25, 26, 27, 28, 29, 30, 31, 32, 33:
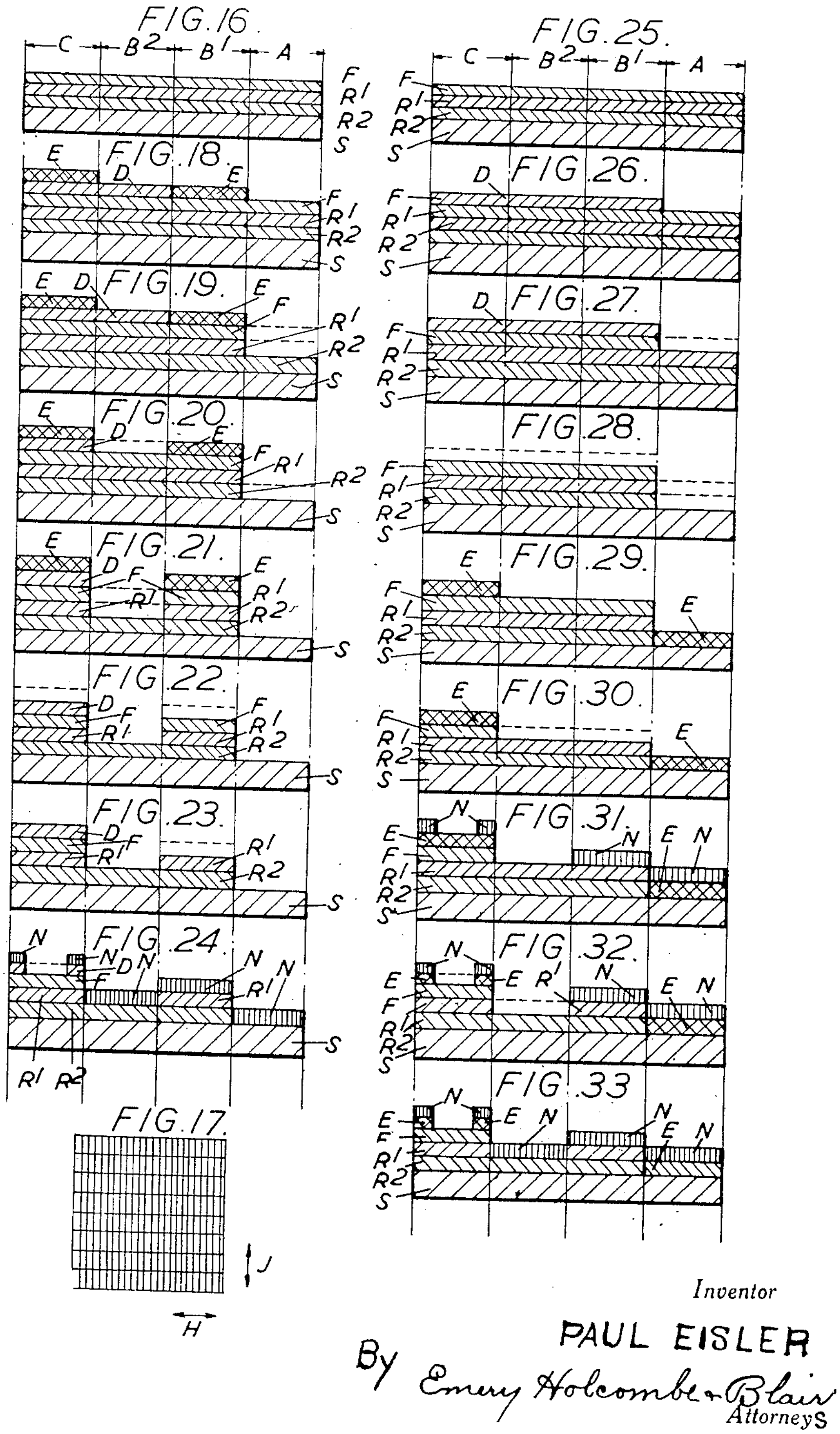
Figures 16 to 24 illustrate various stages in one method of manufacturing a four layer circuit base material.
Figures 25 to 33 illustrate various stages in another method of manufacturing a four layer circuit base material.

If two layers are found to be sufficient for the circuits in question, as shown in Figure 16, the two resistance layers $R^1$ and $R^2$ must not only have the required resistance values per unit of area, but must be capable of being selectively removed, the layer $R^2$ being unaffected by the agent used for removing the layer $R^1$. It is not necessary that there is full reciprocity; the layer $R^1$ need not be unaffected by the agent used for removing the layer $R^2$, since it can be protected during the removal of the unwanted parts of the layer $R^2$ by the metal foil and/or a protective coating or imprint.

The stock shown in Figure 16 may be made up as follows. First of all a sheet of copper foil F is electroplated with an extremely thin lead film which is then converted into lead sulphide by treatment with sodium sulphide to form a resistance layer $R^1$. This layer is then roller coated with a carbon-filled neoprene solution constituting the other resistance layer $R^2$. Finally the double coated foil is secured to an insulating support S, for instance impregnated paper, by a suitable cement. The resulting stock is then tested to ascertain the resistance values of the layers $R^1$ and $R^2$ on the lines indicated in connection with Figures 1 to 7.

Instead of coating the layer $R^2$ completely over the layer $R^1$ it may be applied in reticular form as a series of crossing lines by cross ruling as shown in Figure 17. The network of lines shows a very fine appearance with frequent crossings of the lines. It is so designed that the lines are closer together in one direction H than in the other direction J so that in a given square area the resistance value in the direction H will be greater than the resistance value in the direction J. This enables two different resistance values for the layer $R^2$ to be obtained from an area of resistance material of a given shape, depending upon the direction in which the terminals are arranged. The resistance values in the different directions are determined empirically and are added to the design data for the stock.

The network of lines shown in Figure 17 is made by straight line ruling, but other arrangements may be employed. Thus, for instance, a ruling pen may be oscillated or be moved in circles, so that wavy, cyclic or other curved lines are drawn. Alternatively the pattern may be printed with any design of intersecting lines. The ruling of groups of straight parallel lines at an angle to each other will usually have to be done in two steps, whereas other methods such as printing or ruling with rotating or oscillating pens can be accomplished in only one step.

Apart from the directional values of the resistance of the layer $R^2$, the stock shown in Figure 16 is capable of providing in printed circuits areas having four different characteristics, as follows:

(A) Layers F, $R^1$ and $R^2$ removed, leaving only the insulating support S.

($B^1$) Foil layer F only removed, leaving the resistance layer $R^1$ superimposed on the resistance layer $R^2$ of substantially greater specific resistance, which in turn lies on the insulating support S.

($B^2$) The foil layer F and the upper resistance layer $R^1$ removed, leaving only the resistance layer $R^2$ of relatively high specific resistance upon the insulating support S.

(C) No layers removed, so that the area is highly conducting.

In order to convert the stock of Figure 16 into the required product of Figure 24, a pattern covering the areas C and $B^2$ is printed on the foil using an ink D. A second printing is then carried out which superimposes a layer of ink E over the layer D in the area C, and also over the foil in the area $B^1$. The printed stock is shown in Figure 18. The inks must be capable of selective dissolution; for instance the ink D may be a bituminous ink and the ink E a shellac ink.

Next, the printed material of Figure 18 is etched either chemically, for instance in nitric acid, or electrolytically by being made the anode in a suitable copper and lead sulphide dissolving bath, whereby the copper layer F and the lead sulphide layer $R^1$ are removed from the area A as shown in Figure 19. Next the sheet is treated in a benzene bath, for instance, which removes the exposed carbon-filled neoprene layer $R^2$ from the area A and also dissolves the exposed layer of ink D from the area $B^2$ as shown in Figure 20. The ink E covering areas $B^1$ and C is not attacked by benzene.

Next the sheet is etched as before, with the result that the metal layer F and the lead sulphide layer $R^1$ are removed from the area $B^2$ as shown in Figure 21.

In the next step the sheet is treated with methylated spirit in order to remove the shellac ink E from the areas $B^1$ and C, but it will be observed that the metal foil F in the area C still remains covered by the layer of ink D which is not soluble in methylated spirit. The sheet now has the form shown in Figure 22.

The next step is the removal of the copper foil F from the area $B^1$ without removing either the layer of lead sulphide $R^1$ beneath it or the exposed resistance layer $R^2$ in the area $B^2$. This can be done by etching the copper anodically in an electrolyte which does not enable lead sulphide to go into solution. This electrolyte may consist of a copper sulphate solution kept neutral by the addition of calcium carbonate for instance. This method is rather slow, and a quicker method of removing the copper is first to treat the sheet in a cyanide bath until only a thin film of copper is left and then to transfer the sheet to a bath of the aforesaid electrolyte for removing this thin film of copper. Thorough washing is required after the removal of the copper foil F from the area $B^1$. The product now has the form shown in Figure 23.

In the next step the whole sheet is sprayed with a layer of nitro-cellulose lacquer N except for the electrical connection points on the area C, which can be masked by a stencil. Finally the sheet is treated with benzene which removes the ink D from those parts of area C which were shielded by the stencil, the nitro-cellulose lacquer N protecting the layer $R^2$ in the area $B^2$ from the action of the benzene.

The resulting product is shown in Figure 24. If desired the nitro-cellulose lacquer N can be removed but this is not essential.

Another method of preparing a four layer printed circuit base material is shown in Figures 25 to 33. First of all a stock somewhat similar to that of Figure 16 is prepared, except that in this case the foil is fairly thick and the layer $R^2$ consists of, say, carbon-filled shellac, while the layer $R^1$ consists of a series of intersecting lines ruled with, say, a carbon-filled alkyd resin ink. The coated foil is heat treated so that the shellac film still remains alcohol-soluble while the alkyd film is rendered insoluble in any organic solvent. This stock has the form shown in Figure 25. Next a coating of ink D, for instance a bituminous ink, which is resistant to the etching chemicals or to the anodic bath for the removal of copper is printed on the areas $B^1$, $B^2$ and C as shown in Figure 26. Next the sheet is subjected to chemical or electrolytic etching to remove the copper layer F from the area A as shown in Figure 27.

Next, as shown in Figure 28, the sheet is subjected to a wet abrasion process such as scrubbing with a scouring powder which removes the ink layer D from the areas $B^1$, $B^2$ and C, and also removes both the resistance layers $R^1$ and $R^2$ from the area A.

In the next stage the sheet is coated with a shellac lacquer E, except for the areas $B^1$ and $B^2$ where the metal foil is left exposed as shown in Figure 29. This exposed foil layer is then removed by chemical or electrolytic etching as shown in Figure 30.

Next a layer of nitro-cellulose lacquer N is applied to the areas A and $B^1$ and also to those parts of the area C on which the foil is not required to be exposed. The sheet now has the form shown in Figure 31. Next the sheet is treated with methylated spirit which dissolves the shellac lacquer *e* wherever it is not protected by the nitrocellulose lacquer N. The methylated spirit also dissolves the layer $R^1$ from the area $B^2$ as shown in Figure 32. If desired the areas $B^2$ may be finally coated with protective lacquer N by stencilling, giving a product as shown in Figure 33.

A stock with three resistance layers $R^1$, $R^2$ and $R^3$ sandwiched between the foil layer F and the insulating support S is shown in Figure 34. This stock can not only give a still wider range of resistance values, but it can also simplify the differential dissolution of the resistance layers. This is done by making the central resistance layer $R^2$ very different in solubility from the other resistance layers $R^1$ and $R^3$. If the layer $R^2$ were for example lead sulphide and the layers $R^1$ and $R^3$ were for example carbon-filled albertol films, a step-by-step dissolving procedure could be employed using acid and methylated spirit as the only solvents, and using alcohol-soluble and alcohol-insoluble acid-resisting inks or lacquers respectively as the two protective media. The lead sulphide film $R^2$ would protect the lower albertol-bonded film $R^3$ from the action of an alcohol solvent when the upper albertol-bonded film $R^1$ is being dissolved, while an acid would dissolve the lead sulphide film $R^2$ without attacking the lower layer of albertol-bonded film $R^3$ or the protective media.

The layer $R^2$ can be produced electrolytically on the metal foil F which has previously been coated with the carbon-filled albertol layer $R^1$ by first plating a very thin film of lead on the layer $R^1$ and then chemically converting this lead film into lead sulphide. If required this process can be repeated until a sufficiently thick layer $R^2$ has been obtained. Alternatively the layer $R^2$ might be formed by other methods, such as deposition from the vapour state or by chemical mirror formation.

Although the production of the stock has been described with particular reference to starting with the metal foil F, as is the preferred procedure, it will be appreciated that one can start with the insulating support S, and coat this support with one, two or more resistance layers, finally electroplating the outermost layer with copper or with another highly conductive metal, this electro-plated film constituting the layer F. Alternatively it would be possible to deposit the metal film on the outer resistance layer by vacium deposition, this deposit being reinforced if necessary by plating.

By the use of a highly conductive cement, such as one made of a "Markite" conductive plastic material as referred to above, or such as a fine silver powder in a conventional adhesive, the metal foil could be cemented to the outermost resistance layer. Alternatively a conductive plastic could be coated on the outermost resistance layer and then electroplated or solder-painted to provide the conducting layer. These arrangements also give a strong bond between the conducting layer and the outermost resistance layer. From the point of view of electrical characteristics the conductive cement can be regarded as part of the foil, and must of course be removed with the foil during the etch treatment or subsequently.

The many possible variations in methods and materials for carrying out the invention permit a selection of those most suitable for each particular application. Printed circuits containing resistors are preferably manufactured from stock in which resistance layers are directly coated on to a metal foil. Conductive cement is preferably used when a resistance layer is formed either directly on an insulating support or independently as a self-supporting film which is stuck on to an insulating support. This method can also be used for the production of separate resistors for attachment to printed circuits, e. g. labels, strips or transfers.

One feature common to most aspects of the present invention is the necessity for printing, stencilling or otherwise treating certain areas of a sheet in correct register. It is of course possible to use any of the usual methods of register printing to achieve the desired result, but the etching step affords a simple means for providing mechanical registering of the second and any subsequent printing or coating steps in relation to the first imprint. This can be done by providing for holes or edges at suitable points in the foil areas during the first printing thereon of a protective coating, so that the foil is etched away at these holes or edges in the etching step which follows this protective printing. Then by using these holes or edges in the foil, the printing plates or stencils for subsequent printing or coating operations can be brought mechanically into register.

In a previous example the exposed resistance layer is coated with a varnish or lacquer to protect the layer during any subsequent stages of the processing and for permanent protection afterwards (see Figures 31–33). It has been found that the influence of such coatings is not always compatible with the aim of exact predetermination of the resistance value, since the resistance value is often influenced by the coating in an unpredictable way.

In order to avoid this contingency and to provide protection for the exposed areas of a resistance layer these areas may be provided with a protective mesh screen, for instance of a resinous material. This screen can be applied in several ways. In one method the metal foil is coated, for instance by printing, with a suitable screen before it is bonded to the resistance layer. The screen can be of any convenient shape, for instance a mesh of crossing lines. In another method, instead of the screen being applied to the surface of the foil, grooves may be etched or otherwise produced in the foil and the screen-forming substance placed in these grooves. Before the resistance layer is coated on the screen-bearing foil, or before the foil and the resistance layer are bonded together with the screen between them, the screen-forming substance should be properly set, e. g. polymerised, so that this substance cannot influence the resistance value in an unpredictable manner. Thus when the metal foil has been etched away the mesh screen will remain superimposed upon the resistance layer.

In the areas where the resistance layer has to be removed, a solvent for the screen substance may be applied first so as to expose the whole of the resistance area which is to be removed. Alternatively, if the resistance layer is to be removed by washing with an agent which attacks the cement by which the resistance layer is secured to the underlying layer, there may be no necessity for first removing the screen, since this will come away with the resistance material.

By making the screen-forming substance slightly conductive, for instance by including a small amount of colloidal graphite or other carbon particles therein, the electrical characteristics of the resistance layer will differ somewhat from those of an equivalent unscreened layer, and some useful additional effects can be achieved. For instance, the screen will bridge any pinhole or fine crack in the resistance layer without significantly altering the electrical characteristics of the screened area. By varying the widths of the lines in the screen different resistance values per square area can be obtained. This can also be done by superimposing two or more screens formed of substances which are capable of selective removal, so that by suitable treatments exposed areas of either screen can be removed. It should be borne in mind when superimposed screens are used that areas of metal foil must remain visible in the interstices between the screens to permit the resistance material to make contact with the foil.

Reference has been made above to the possibility of providing temperature-stable resistance layers consisting of certain metal alloys. Temperature-stable layers of carbon-filled resistance material can be achieved as follows. Such layers normally have a negative temperature coefficient of resistance, but if the layer is mechanically strained the resistance will increase with the strain. Thus by causing the insulating support to expand or otherwise change its shape as the temperature rises, in such a manner as to increase the mechanical strain in the layer, the negative temperature coefficient can be wholly or partly compensated. This principle can be employed also to give, within limits, any desired temperature coefficient, and resistors embodying the principle may therefore be employed in many forms of apparatus where indication, measurement or control as a function of temperature or strain of the resistance layer is required. If the temperature-strain characteristic given by the expansion of the insulating support is not satisfactory a bimetallic thermometal strip can be secured to the insulating support on the side opposite to the resistance layer in question. This thermometal strip will bend as the temperature changes, thus stretching or compressing the resistance layer depending upon the direction of bend, thus altering the resistance value of the resistance layer. Both carbon and metallic resistance layers can be used with this arrangement, and according to the matching of the various elements either a degree of compensation of the temperature constant of the resistance layer, or an accentuation of it for temperature indicating purposes, can be achieved. It will be appreciated that the influence of strain on the resistance value of a resistance layer can be used for other purposes as well.

Resistance layers consisting of colloidal graphite in an elastic resin such as a silicone or chlorinated rubber, have been found to exhibit in a satisfactory degree the property of varying their resistance in dependence upon strain. An elongation increases the resistance and a compression decreases it. Other resistance layers have the same property.

Thus by mounting such layers on flexible supports in accordance with the invention they can be used as rheostats or variable resistors for a variety of purposes, such as strain gauges, volume controls, pressure gauges, diaphragm microphones or gramophone pick-ups and the like, where the support is deflected in accordance with a change in a variable quantity and the change in the resistance value provides a measure of the change in the variable quantity.

Conveniently, therefore, such a resistor may be incorporated in a device adapted to subject the insulating support to mechanical force and associated with an electric circuit for indicating the resistance value of the resistor and hence the magnitude of other characteristic (e. g. frequency) of the applied force.

What I claim is:

1. A novel article of manufacture in form of a multi-layer stock for the manufacture therefrom of a plurality of electrical resistors and printed circuits containing resistors and comprising an insulating support, at least one layer of electrical resistance material adhering to the support and having an area in excess of the area of all resistors to be made from the stock, and a layer of a highly conductive material adhering to the resistance material and in intimate electrical contact therewith.

2. A multi-layer stock as claimed in claim 1 in which the insulating support and the other layers are flexible.

3. A multi-layer stock as claimed in claim 1 in which the highly conductive layer consists of metal foil.

4. A multi-layer stock as claimed in claim 1 in which the highly conductive layer and the resistance layer adjacent thereto are in form of a bimetal sheet, the resistance layer of the bimetal sheet comprising a thin layer of metal having a high specific resistance and being inert to at least one agent adapted to remove the highly conductive layer.

5. A multi-layer stock as claimed in claim 1 in which the highly conductive layer and the resistance layer adjacent thereto are in form of a roller-clad bimetal foil, the resistance layer consisting of a thin rolled out layer of a non-corrosive ductile metal and the insulating support being made of a readily deformable material.

6. A multi-layer stock as claimed in claim 1 in which at least one resistance layer consists of a "semi-conducting" substance.

7. A multi-layer stock as claimed in claim 1 in which at least one resistance layer is of reticular form and its resistance per square area has different values for different directions of current flow.

8. A multi-layer stock as claimed in claim 1 in which a protective mesh screen is disposed between the highly conductive layer and the resistance layer adjacent thereto, whereby screen protects the resistance layer at least underneath the lattice of the mesh screen when an area of the highly conductive layer is removed.

9. A multi-layer stock as claimed in claim 8 in which the highly conductive layer consists of metal foil formed with grooves, the said protective mesh screen being fitted in said grooves.

10. A multi-layer stock as claimed in claim 1 in which there are at least two superimposed protective mesh screens between the highly conductive layer and the resistance layer adjacent thereto, the materials of these screens having different properties which render them susceptible of selective removal.

11. A multi-layer stock as claimed in claim 1 in which the insulating support is perforated for making electrical connections to the inner surface of the adjacent resistance layer.

12. A novel article of manufacture in form of a multi-layer stock for the manufacture therefrom of a plurality of electrical resistors and printed circuits containing resistors and comprising an insulating support, at least two superimposed layers of electrical resistance material on the support and having an area in excess of the area of all resistors to be made from the stock, and a layer of a highly conductive material adherent to the outermost resistance layer and in intimate electrical contact therewith, the materials of the resistance layers having different properties which render them susceptible of selective removal.

13. A novel article of manufacture in form of a multi-layer stock for the manufacture therefrom of a plurality of electrical resistors and printed circuits containing resistors and comprising an insulating support, three superimposed layers of resistance material on the support and having an area in excess of the area of all resistors to be made from the stock, and a highly conductive layer adherent to the outermost resistance layer, the material of the central resistance layer having different properties from the materials of the other resistance layers so as to render the layers susceptible of selective removal.

14. A multi-layer stock as claimed in claim 1 in which the insulating support is made of a material subject to significant dimensional variations in dependence on changes of temperature.

15. A multi-layer stock as claimed in claim 1 in which the said insulating support is made of readily deformable material and a bimetal strip is operatively connected with the insulating support so as to bend the insulating support in dependence on changes of temperature.

16. A novel article of manufacture in form of a multi-layer stock for the manufacture therefrom of a plurality of printed circuits containing resistors and capacitors and comprising a thin insulating support having uniform dielectric properties for making it usable as a capacitor dielectric of known square area permittivity, at least one layer of electrical resistance material adherent to the support and having an area in excess of the area of all resistors to be made from the stock, and a layer of a highly conductive material adherent to the resistance material and in intimate electrical contact therewith.

17. A novel article of manufacture in form of a multi-layer stock for the manufacture therefrom of a plurality of electrical resistors and printed circuits containing resistors and comprising an insulating support, at least one layer of resistance material adherent to one side of the support and having an area in excess of the area of all resistors to be made from the stock, a layer of a highly conductive material adherent to this resistance layer and in intimate electrical contact therewith, and a further highly conductive layer on the other side of the insulating support.

18. A multi-layer stock as claimed in claim 17, in which there is at least one further resistance layer between the insulating support and the said further highly conductive layer, this resistance layer also having an area in excess of all resistors to be made from the stock.

19. A method of making a multi-layer resistor and printed circuit stock consisting of an insulating support, at least one layer of electrical resistance material adherent to the support and having an area in excess of the area of all resistors to be made from the stock, and a layer of metal foil adherent to the resistance material and in intimate electrical contact therewith, which method includes the step of applying at least one resistance layer to the foil by a coating process.

20. A method as claimed in claim 19 which includes the step of heat-treating the foil when it has been coated with the said resistance layer.

21. A method of making a multi-layer resistance and printed circuit stock consisting of an insulating support, at least one layer of electrical resistance material adherent to the support and having an area in excess of the area of all resistors to be made from the stock, and a layer of a highly conductive material adherent to the resistance material and in intimate electrical contact therewith, which method includes the final steps of exposing a resistance layer in selected places, ascertaining the square area resistance value of this layer, and marking the stock to indicate the value thus ascertained.

22. A method of making a resistor or a printed circuit containing a resistor from a stock consisting of an insulating support, at least one layer of electrical resistance material adherent to the support and having an area in excess of the area of all resistors to be made from the stock, and a layer of a highly conductive material adherent to the resistance material and in intimate electrical contact therewith, which method comprises selectively removing certain areas of at least one of the layers by treatment with an agent capable of removing the said layer while protecting from the action of the agent those areas of the said layer that are to be retained.

23. A method as claimed in claim 22 in which the protection is at least partly afforded by the presence of an overlying layer which is unaffected by the said agent.

24. A method as claimed in claim 23 for a stock whereof the highly conductive layer consists of metal foil, which comprises first removing metal foil only from areas in which an underlying resistance layer is to be removed, and then removing the unwanted areas of the resistance layer by an abrasive treatment, the other areas being protected from abrasion by the metal foil.

25. A method as claimed in claim 22 in which the highly conductive layer of the stock is metallic and is removed by an etching process from areas where it is not required.

26. A method as claimed in claim 22 in which areas of exposed layers which are to be retained are printed over with an ink which resists the action of the said removal agent.

27. A method as claimed in claim 22 whereby at least two underlying layers are exposed in different areas, which comprises first applying to the highly conductive layer a protective pattern which leaves unprotected the area of the lowest layer which is to be exposed, removing from the unprotected area the highly conductive layer and any other layers overlying the said lowest layer, then removing some of the protective pattern to expose the area of the next layer which is to be exposed, and finally removing the highly conductive layer from this now unprotected area.

28. A method as claimed in claim 27 in which the part of the protective pattern which is to be removed prior to the second stage in the removal of the unwanted parts of the stock is susceptible to removal by an agent which will not affect the rest of the protective pattern.

29. A method as claimed in claim 28 in which the parts of the protective pattern which are capable of selective removal are formed by printing on the highly conductive layer with two different inks one of which can be removed by an agent which will not affect the other.

30. A method as claimed in claim 22 which includes the step of applying a protective coating to the highly conductive layer of the stock in such a manner that at least at one place at the boundary of the coated area there is a progressive diminution in the effectiveness of the protection, thereby providing a relatively gradual transition between a highly conductive area and a resistance area at this place in the resulting product.

31. A method as claimed in claim 22 which includes forming edges in the highly conductive layer during the first removal of portions of this layer, which edges serve as registers for an appliance employed in a subsequent operation.

32. A resistor made from a multi-layer stock consisting of a readily deformable insulating support, at least one layer of an electrical resistance material adherent to the support whose resistance value changes when it is subjected to strain, and a layer of a highly conductive material coextensive with and adherent to the resistance material and in intimate electrical contact therewith, said layers being partly removed during the process of making which resistor is incorporated in a device provided with means for subjecting the insulating support to mechanical force, and in an electric circuit which indicates its resistance value and hence a characteristic of the applied force.

33. An electrical resistance material for use in printed circuit products comprising an insulating support in sheet form, at least one layer of electrical resistance material adhering to one side of said support and overlying an area thereon smaller than the total area of the support for exposing part of the support, and a layer of highly conductive material adhering to the outer side of the resistance material in intimate contact therewith and overlying an area thereon smaller than the total area of the resistance material for exposing part of the resistance material, the said support and the said layers being made of a pliable material.

34. A resistance material according to claim 33, wherein the border line between the resistance material and the highly conductive material is in form of a serrated edge.

35. A novel article of manufacture for manufacturing therefrom by division a plurality of individual resistors and printed circuit components including resistors, the said article comprising a multiple layer stock composed of a plane insulation layer, at least one plane resistance layer adhering to said insulation layer, and a plane electrically highly conductive layer adhering to the resistance layer, the said layers being substantially coextensive in area, and the material of said resistance layer being inert to at least one agent adapted to remove said conductive layer for selectively varying the area of said conductive layer relative to the resistance layer.

36. A novel article of manufacture for manufacturing therefrom by division a plurality of individual resistors and printed circuit components including resistors, the said article comprising a multiple layer stock composed of a plane insulation layer, at least one plane resistance layer adhering to said insulation layer, and a plane electrically highly conductive layer adhering to the resistance layer, the said layers being substantially coextensive in area, and the said conductive layer and the said resistance layer being made of materials selectively removable by chemical action.

PAUL EISLER.

References Cited in the file of this patent

UNITED STATES PATENTS

| Number | Name | Date |
|---|---|---|
| 1,632,651 | Hubbard | June 14, 1927 |
| 2,060,114 | Podolsky | Nov. 10, 1936 |
| 2,061,107 | Schellenger | Nov. 17, 1936 |
| 2,075,733 | Lazarus | Mar. 30, 1937 |
| 2,441,960 | Eisler | May 25, 1948 |
| 2,486,865 | Montague | Nov. 1, 1949 |
| 2,493,542 | McGraw | Jan. 3, 1950 |
| 2,493,745 | Blodgett et al. | Jan. 10, 1950 |

FOREIGN PATENTS

| Number | Country | Date |
|---|---|---|
| 570,877 | Great Britain | July 26, 1945 |